Jan. 6, 1925.

C. R. PRATT 1,522,460

MACHINE TOOL AND CHUCKING SYSTEM THEREFOR

Filed July 16, 1920   3 Sheets-Sheet 1

Inventor:
Charles R. Pratt,
by Emery Booth Janney Varney
Attys

Jan. 6, 1925.  1,522,460
C. R. PRATT
MACHINE TOOL AND CHUCKING SYSTEM THEREFOR
Filed July 16, 1920   3 Sheets-Sheet 2

Inventor:
Charles R. Pratt.
by Emery Booth Janney & Varney
Att'ys

Jan. 6, 1925. 1,522,460
C. R. PRATT
MACHINE TOOL AND CHUCKING SYSTEM THEREFOR
Filed July 16, 1920 3 Sheets-Sheet 3
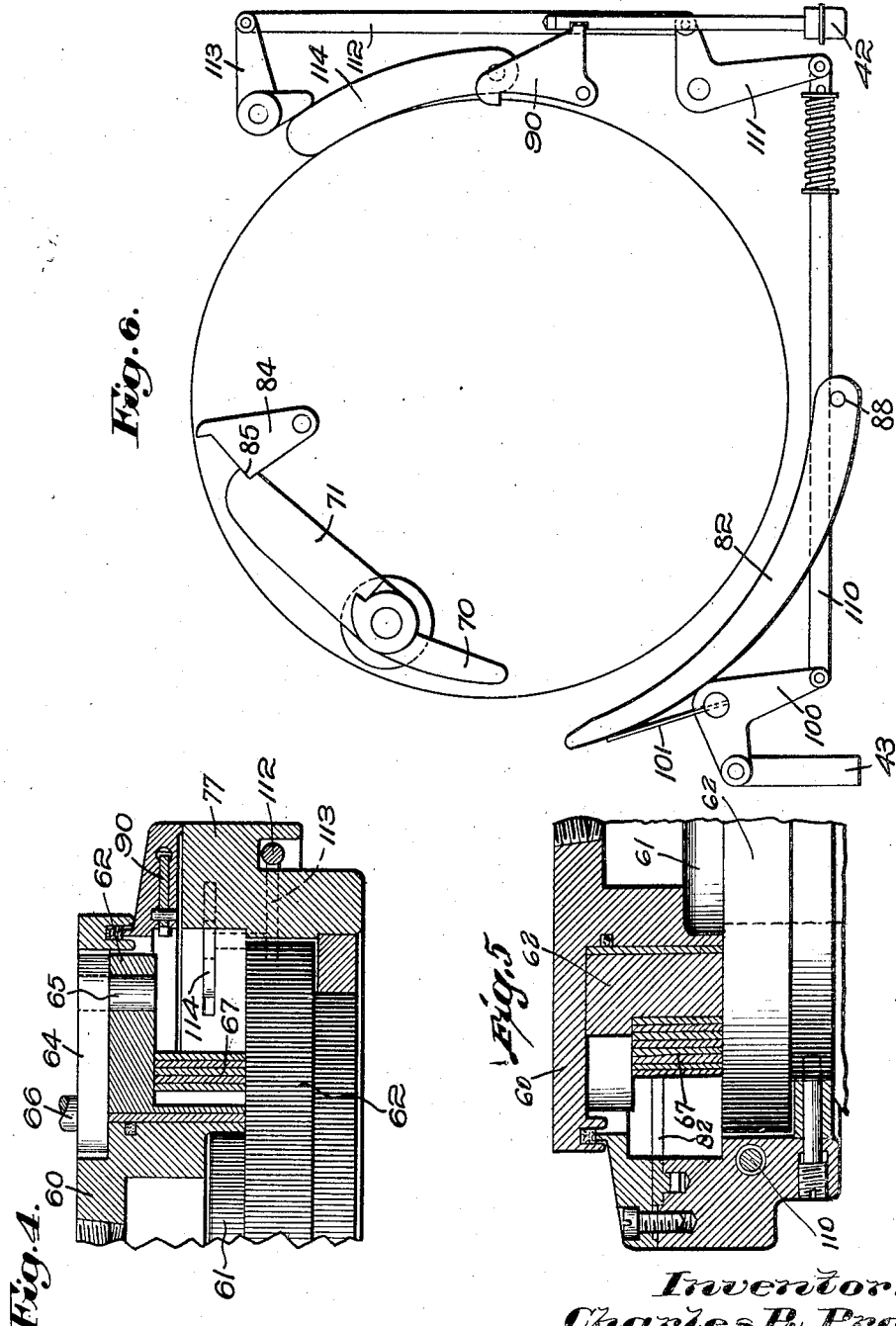
Inventor:
Charles R. Pratt.
by Emery Booth Janney Varney
Attys Patented Jan. 6, 1925.

1,522,460

UNITED STATES PATENT OFFICE.

CHARLES R. PRATT, OF MONTCLAIR, NEW JERSEY, ASSIGNOR TO THE E. HORTON & SON COMPANY, OF WINDSOR LOCKS, CONNECTICUT, A CORPORATION OF CONNECTICUT.

MACHINE TOOL AND CHUCKING SYSTEM THEREFOR.

Application filed July 16, 1920. Serial No. 396,806.

*To all whom it may concern:*

Be it known that I, CHARLES R. PRATT, a citizen of the United States, and a resident of Montclair, in the county of Essex, State of New Jersey, have invented an Improvement in Machine Tools and Chucking Systems Therefor, of which the following description, in connection with the accompanying drawings, is a specification, like characters on the drawings representing like parts.

This invention pertains to improvements in machine tools and chucking systems therefor.

It is among the objects of the invention to facilitate the chucking of work, more particularly, though not exclusively, in tools of the type wherein several spindles are progressively advanced step by step for various operations, a prominent example of such machines being the Bullard "Mult-au-matic" lathe.

In the drawings, which show a preferred form of one embodiment of my invention:—

Fig. 4 is a section on the line 4—4 of Fig. 2;

Fig. 5 is a section on the line 5—5 of Fig. 2;

Fig. 6 is a diagrammatic plan view showing details of the chuck-controlling mechanism best shown in Fig. 2.

Figure 1:
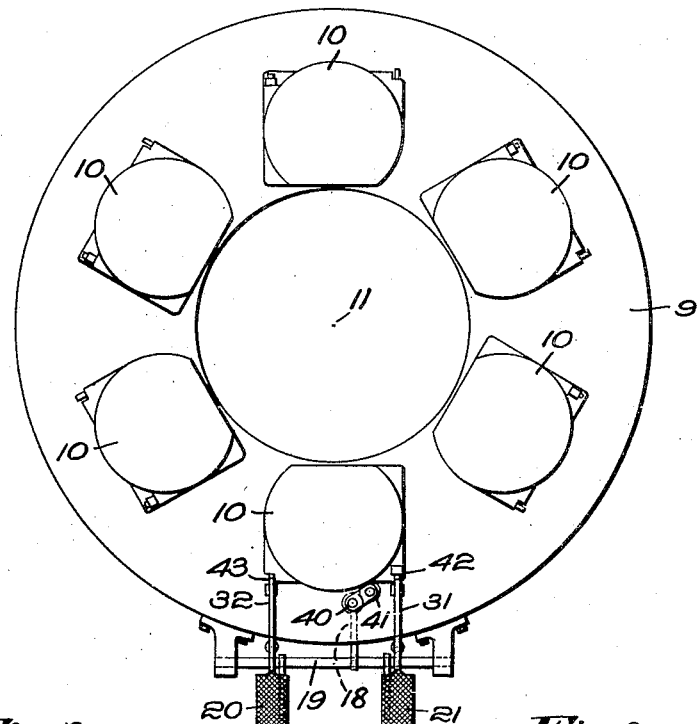
Fig. 1 is a diagrammatic plan view showing a machine tool of the Bullard "Mult-aumatic" type provided with a preferred embodiment of my improved chucking system.
Figure 7:
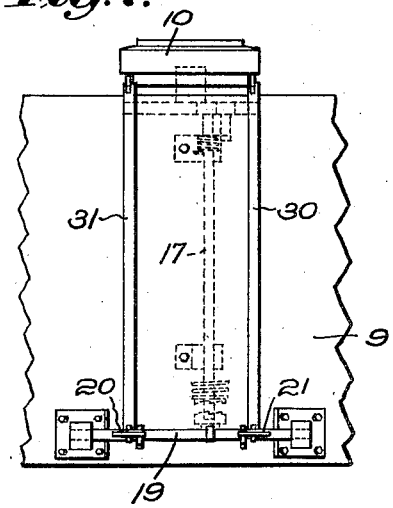
Figs. 7 and 8 are front and side elevations, respectively, of the preferred forms of drives and controls for the chuck-operating mechanism.
Figure 8:
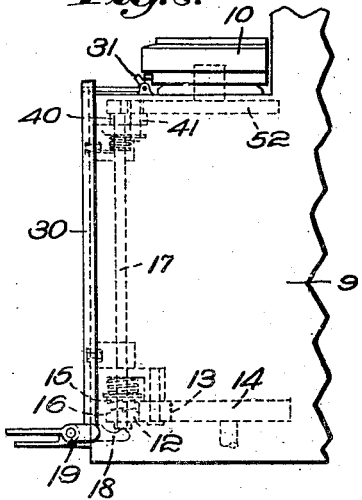

Referring to the drawings and to the preferred form of my invention selected for illustrative purposes, I have shown a machine tool having an indexing turret 9, supplied with any usual indexing mechanism for providing progressive, step-by-step, intermittent movement thereof, thereby progressively to rotate a plurality of work spindles each carrying a chuck 10 about the axis 11 of the turret. The machine may provide any usual or suitable mechanisms for machining the work carried by the chucks and a loading station whereat the finished work may be removed from the chucks and new work therein inserted. At this loading station, I preferably provide power means for operating the chucks, and such power means in the form of my invention selected for illustrative purposes may include a pinion 12 constantly driven from any suitable source typified by the pinion 13 and gear 14. Operator-controlled means may be provided for connecting and disconnecting the chuck-operating power, such controlled means conveniently taking the form of a clutch 15, 16 whereby the pinion 12 may be rotated idly on the shaft 17 or may rotate the same. The clutch 15, 16 may be thrown in and out by movement of a clutch-throwing lever 18, which may be keyed to a pedal shaft 19 carrying two pedals 20 and 21, one for operating the chuck in work-engaging direction and the other for operating the chuck in work-releasing direction.

In the preferred form of my invention illustrated, the pedal 20 controls the operation of the chuck in work-engaging direction.

When a chuck arrives at the loading station the operator depresses the pedal 21, this throws the clutch 15, 16 into engagement and also raises the rod 30 which rocks the bell crank 31 and presses the plunger 42 which sets the jaw-opening mechanism, more fully described hereinafter, in operation.

When the chuck jaws have opened sufficiently to release the work, the operator takes his foot off the pedal 21, removes the finished work and inserts the new work between the opened chuck jaws. He now presses the pedal 20, which throws the clutch 15, 16 again into operation, and also moves upwardly the rod 31, thereby rocking the bell crank 32 and pressing in the plunger 43, which sets the jaw-closing mechanism in operation as described hereinafter.

The preferred form of clutch-operating mechanism shown in the drawings includes means for rotating the chuck to engage and disengage the work as distinguished from rotation of the chuck during machining operations, such means driven from the shaft 17 as by pinions 40, 41 adapted to rotate gear 52, which may conveniently be the same gear which rotates the chuck during machining operations.

The gear 52 accompanies the chuck as it moves from the loading station, and the plungers 42, 43 also accompany the chuck, the parts numbered from 12 through 41 remaining at the loading station for operation on the various chucks of the machine as they successively come to the loading station. The spring 43 presses the pinion 41 into engagement with the gear 52, while permitting the gear 41 to swing out of the path of the gears 52 during the indexing operation.

I will now describe the chucks proper and those portions of the chuck-operating mechanism which are carried by and rotate with the turret 9.

Figure 2:
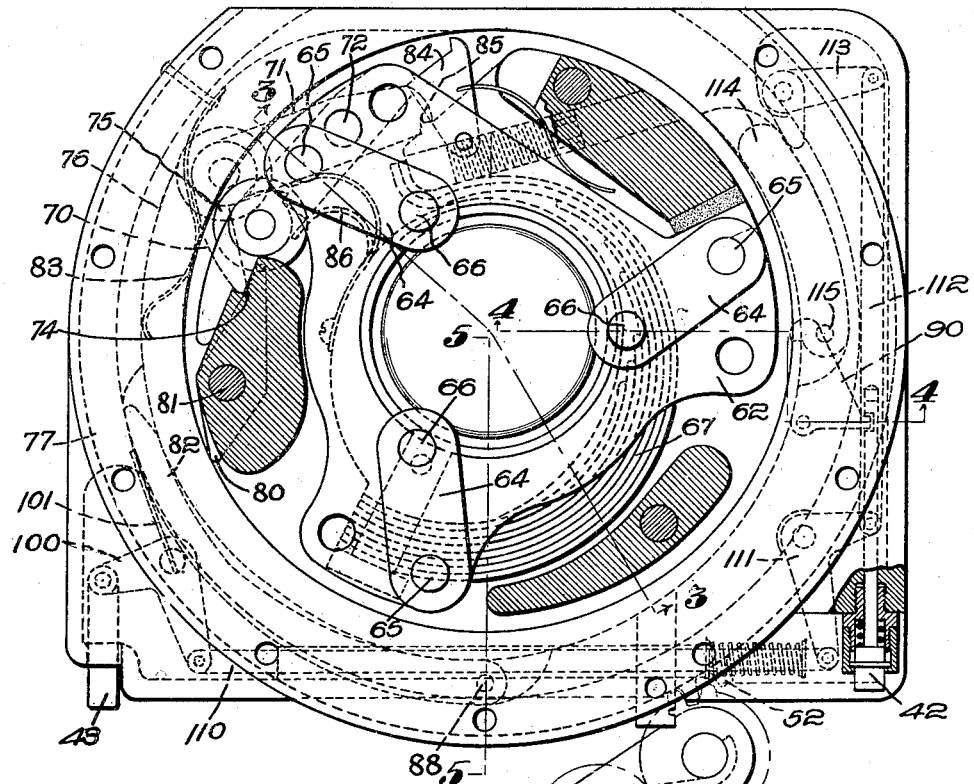
Fig. 2 is a plan view, partly in section, showing one of the chucks illustrated in Fig. 1.
Figure 3:
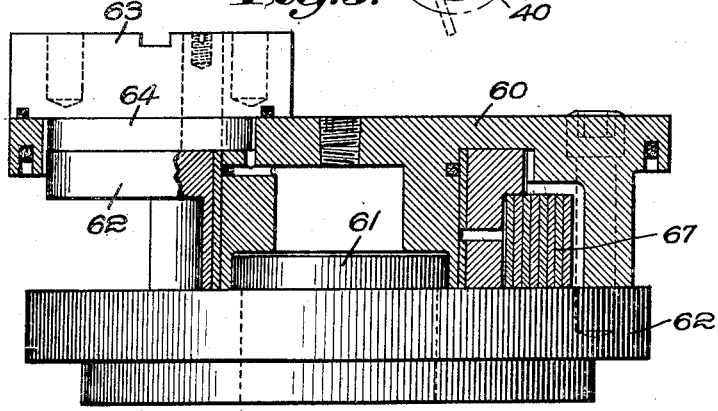
Fig. 3 is a section on the line 3—3 of Fig. 2, being partly in elevation and only parts of the chuck proper being shown.

The chucks illustrated are of the general type shown in my co-pending applications Serial Numbers 386,493, and 386,494, filed respectively June 4th, 1920, each including, as best shown in Figs. 2 and 3, a body portion 60 chambered out to fit over the boss 61 projecting centrally from the cooperating rotatable chuck plate 62 of the machine. Each chuck, as shown, includes a spider 62 oscillatable relative to the chuck body and connected to the chuck jaws 63 by links 64, pivoted at 65 to the spider and at 66 to the chuck jaws, which slide radially in the face of the chuck body 60. Oscillation of the spider 62 relative to the chuck body in a contra-clockwise direction as viewed in Fig. 2, will close the jaws on the work, for internal chucking, while oscillation of the spider in a clockwise direction relative to the chuck body will release the work. It is obvious that the chuck may be adapted to external chucking by reversal of the toggle connections as described in my co-pending applications referred to above.

In the preferred form of my invention illustrated, the work-gripping movement of the jaws is yieldingly actuated by spring means typified by the leaf spring 67 connected to the spider and to the chuck body and tending to turn the spider relative to the chuck body in the contra-clockwise direction.

Movement of the spider relative to the chuck body in a clockwise direction may be effected through the necessary number of degrees (about eleven degrees in the form illustrated) against the pressure of the spring 67 by independent power means engaging the spider 62 and body 60 to produce the relative angular movement between them.

I may conveniently effect this relative angular movement by toggle means typified by the links 70, 71, of which the link 71 may be connected to the spider 62 by a pin 72, the link 70 entering a notch in a part 74 carried by the chuck body, the toggle preferably carrying a roller 75 adapted when desired to track against a cam surface 76 surrounding the chuck, this cam surface conveniently formed by the interior surface of a casting 77 (see Figs. 4 and 5) bolted to the turret 9. It will be understood that I am describing, in detail, but one of the chuck mechanisms, the six illustrated being similar in construction. As the chuck arrives at the loading station, the gear 52 meshes with the pinion 41, and the operator presses the foot pedal 21, thereby pushing in the push button 42 by means of the rod 30 and bell crank 31, and also throwing in the clutch 15, 16 by operation of the lever 18, thus causing the chuck to rotate in a contra-clockwise direction. When the chuck arrives at the loading station, the toggle links 70, 71 are in straightened or inoperative position shown in full lines in Fig. 2.

The push button 42 throws the latch 90 into the path of the latch 84 and releases the toggle link 71 at the minimum radius point of cam 76. Further rotation of the chuck carries the roll 75 to the maximum radius depression of the cam 76, the spring 86 aiding in this action, and the link 70 is pushed into the notch 74 by the spring 83. Further rotation of the chuck causes the roll 75 to follow the decreasing radii of the cam 76, thereby straightening out the toggle 70, 71 the link 70 in the notch 74 transmitting an end thrust to spider 62 by the link 71, thereby causing the spider 62 to rotate in a clockwise direction, flexing the spring 67 and releasing the jaws from the work.

After removing the finished work from the jaws and putting in the work to be tooled, the operator presses the foot pedal 20, starting the chuck again in a contra-clockwise rotation by means of the lever 18 and clutch 15, 16, thereby allowing the roll 75 to run out into the maximum radius pocket of the cam 76, aided by the spring 86, and the spider 62 to be rotated in a contra-clockwise direction by a reaction pressure of the spring 67, thereby forcing the jaws outward against the work for internal chucking.

Mechanism is provided for throwing the work-releasing toggle out of operation pursuant to the chuck loading operation, so that during rotation of the chuck for machining purposes the work will not be released. This mechanism for throwing the toggle out of operation preferably operates as follows:—when the operator presses down on the pedal 20, thereby pressing in the push button 43 and throwing in the clutch 15, 16 through operation of the lever 18 and connected parts, the chuck body is rotated in a contra-clockwise direction, throwing the finger 82 into the path of the latch 80, causing it to rock on its pivot 81, and throwing the link 70 out of its notch 74 at a point of maximum radius of the cam 76, at a time when there is no end thrust on the toggle link 70, 71. Further rotation of the chuck body causes the roll 75 to be forced in radially by the cam 76, thereby straightening the toggle 70, 71, the link 70 lying idle on the surface of the boss which contains the notch 74. The pressing in of the button 43 forces the finger 82, fulcrumed at 88, into the path of the latch 80 by means of the bell crank lever 100 and spring lever arm 101, also throwing the finger 114 into the path of the roll 75 by action of the bell crank 100, rod 110, bell crank 111, rod 112 and bell crank 113, pressure of the finger 114 on the roll 75 further straightening out the toggle 70, 71 until the latches 80, 84 engages the notch 85 in the toggle link 71. This completes the operation of locking the toggle 70, 71 out of further engagement with the cam 76 and allows the jaws to press the work under full spring pressure, as the chuck proceeds to its various tooling stations.

A summary of the cycle of operations includes the arrival of the chuck at the loading station with the toggle 70, 71 in straightened inoperative position and with the work grasped by the chuck jaws. Pressure on the pedal 21 throws in the driving gearing to rotate the chuck and advances the trip 90 into the path of the latch 84, which when tripped permits the spring 86 to press the toggle roller 75 against the cam surface 76 and engages the toggle link 70 in the notch 74 by spring 83. Further rotation of the chuck causes the cam surface 76 to press and straighten the toggle 70, 71, thereby moving the spider 62 against the pressure of the spring 67 and through jaw toggles 64, 64, 64 retracts the jaws 63 from the work. The pedal 21 may now be released, which will disconnect the driving gears, and the finished work may be removed and new work inserted in the chuck jaws.

Pressure on the pedal 20 will then retract the trip 90, and throw the finger 82 against the kick-out 80, which will displace the end of the toggle link 70 from its notch 74 and rotation of the chuck will straighten the toggle 70, 71 until caught by the catch 84 engaging the notch 85 in the toggle link 71. The pedal 20 is then released, disconnecting the chuck-rotating gearing and completing the cycle of a single operation at the loading station.

While I have shown and described a preferred form of one embodiment of my invention, it will be understood that changes involving omission, substitution, alteration and reversal of parts, and even changes in the mode of operation, may be made without departing from the scope of my invention, which is best defined in the following claims.

Claims:

1. A chuck comprising, in combination, a plurality of jaws, spring means urging said jaws toward the work, a cam non-rotative relative to the axis of the chuck, and means operatively interposed between said cam and said spring for stressing said spring to release the work from spring-actuated clamping pressure of said jaws.

2. A chuck comprising, in combination, a body, a plurality of jaws, spring means urging said jaws toward the work, a cam surrounding said chuck body, said cam effective to retract said jaws from the work, said chuck body and jaws rotative within said cam, and means for rendering said cam effective or ineffective to actuate movement of said jaws when said chuck is rotated in said cam.

3. A machine tool comprising, in combination, a plurality of rotary work spindles, each spindle provided with a rotary work-gripping chuck including a body having jaws, a jaw actuating part rotatable relatively to said body, means for progressively rotating said spindles about a common axis in progressive steps whereat various machining operations are performed, a loading station whereat one of said spindles during each period of rest between progressive steps is readily available for removal of finished work from its chuck and the insertion of new work into said chuck, and power means permanently located at said loading station for causing rotation of said chuck body for causing relative rotation between said jaw actuating part and said chuck body.

4. A machine tool comprising, in combination, a plurality of rotary work spindles, each spindle provided with a rotary work-gripping chuck including a body having jaws, a jaw actuating part rotatable relatively to said body, means for progressively rotating said spindles about a common axis in progressive steps whereat various machining operations are performed, a loading station whereat one of said spindles during each period of rest between progressive steps is readily available for removal of finished work from its chuck and the insertion of new work into said chuck and foot-controlled power means permanently located at said loading station for causing rotation of said chuck body for causing relative rotation between said jaw actuating part and said chuck body.

5. A machine tool comprising, in combination, a plurality of work spindles, each spindle provided with a work-gripping chuck, means for progressively rotating said spindles about a common axis in progressive steps whereat various machining operations are performed, a loading station whereat one of said spindles during each period of rest between progressive steps is readily available for removal of finished work from its chuck and the insertion of new work into said chuck, and power means controllable by the operator while his two hands engage the work at said loading station for operating said chuck.

6. A chuck comprising, in combination, a body, a plurality of jaws, spring means urging said jaws toward the work, toggle means for stressing said spring to release the jaws from the work, a cam non-rotative relative to the axis of the chuck, and means for operating said toggle by said cam when the spindle is rotated.

7. A chuck comprising, in combination, a body, a plurality of jaws, spring means urging said jaws toward the work, toggle means for stressing said spring to release the jaws from the work, a cam non-rotative relative to the axis of the chuck, means for operating said toggle by said cam when the spindle is rotated, and means for rendering said cam ineffective to operate said toggle during working rotation of said chuck.

8. A chuck comprising, in combination, a body, a plurality of jaws, a spider, link means between said spider and jaws, a spring actuating oscillation of said spider in work-gripping direction, a toggle actuating said jaws in work-releasing direction and a cam for operating said toggle, said cam non-rotative relative to the axis of said chuck.

9. A machine tool comprising, in combination, a plurality of rotary work spindles, each provided with a rotary work-gripping chuck including a body having jaws, a jaw actuating part rotatable relatively to said body, step-by-step rotative means for progressively rotating said spindles about a common axis in progressive steps whereat various machining operations are performed, a loading station whereat one of said spindles during each period of rest becomes readily available for removal of finished work and insertion of new work into said chuck, and rotary power means remaining at said loading station and effective to operate progressively the chucks carried by said spindles as they come to loading position by causing rotation of the chuck bodies for causing relative rotation between said chuck bodies and the jaw actuating parts.

10. A machine tool comprising, in combination, a plurality of rotary work spindles, each provided with a rotary work-gripping chuck including a body having jaws, a jaw actuating part rotatable relatively to said body, step-by-step rotative means for progressively rotating said spindles about a common axis in progressive steps whereat various machining operations are performed, a loading station whereat one of said spindles during each period of rest becomes readily available for removal of finished work and insertion of new work into said chuck and power gearing means remaining at said loading station and effective to operate progressively the chucks carried by said spindles as they come to loading position by causing rotation of the chuck bodies for causing relative rotation between said chuck bodies and the jaw actuating parts.

11. A machine tool comprising, in combination, a plurality of work spindles each rotatable about its own axis, each spindle carrying a work-gripping chuck including a body and jaws movable relative to said body, a jaw moving part within said body and rotatable relatively to said body, means for progressively rotating said spindles about a common axis in progressive steps between which various machining operations are performed on articles held in said jaws, a loading station whereat one of said spindles during each period of rest between progressive steps is readily available for removal of finished work from its chuck and the insertion of new work into said chuck, and rotary power means permanently located at said loading station for progressively supplying power for operating said chucks by causing rotary movement of said chuck body and for causing relative rotation between said jaw moving part and said chuck body.

12. A machine tool comprising, in combination, a plurality of work spindles each rotatable about its own axis, each spindle carrying a work-gripping chuck including a body and jaws movable relative to said body, a jaw moving part within said body and rotatable relatively to said body, means for progressively rotating said spindles about a common axis in progressive steps between which various machining operations are performed on articles held in said jaws, a loading station whereat one of said spindles during each period of rest between progressive steps is readily available for removal of finished work from its chuck and the insertion of new work into said chuck, and rotary power means including a gear permanently located at said loading station for progressively supplying power for operating said chucks by causing rotary movement of chuck body for causing relative rotation between said jaw moving part and said chuck body.

In testimony whereof, I have signed my name to this specification.

CHARLES R. PRATT.